United States Patent
Wasserman et al.

(10) Patent No.: US 6,900,169 B2
(45) Date of Patent: *May 31, 2005

(54) PROCESS FOR COATING DETERGENT GRANULES IN A FLUIDIZED BED

(75) Inventors: Matthew Israel Wasserman, Princeton, NJ (US); Mark William Ridyard, Heaton Newcastle (GB); Scott William Capeci, North Bend, OH (US); Wayne Edward Beimesch, Covington, KY (US); Paul R Mort, III, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/880,689

(22) Filed: Jun. 30, 2004

(65) Prior Publication Data

US 2004/0235704 A1 Nov. 25, 2004

Related U.S. Application Data

(62) Division of application No. 09/980,327, filed on Nov. 30, 2001, now Pat. No. 6,790,821.
(60) Provisional application No. 60/143,578, filed on Jul. 13, 1999, and provisional application No. 60/140,087, filed on Jun. 21, 1999.

(51) Int. Cl.$^7$ .................................................. C11D 11/00
(52) U.S. Cl. .................... 510/441; 510/442; 510/438; 510/444
(58) Field of Search ................................. 510/441, 442, 510/438, 444

(56) References Cited

U.S. PATENT DOCUMENTS

| 6,056,905 | A | * | 5/2000 | Akkermans et al. | 264/117 |
| 6,143,711 | A | * | 11/2000 | Del Greco et al. | 510/444 |
| 6,579,844 | B1 | * | 6/2003 | Morrison et al. | 510/445 |
| 6,583,098 | B1 | * | 6/2003 | Cassie | 510/376 |
| 6,790,821 | B1 | * | 9/2004 | Wasserman et al. | 510/441 |
| 6,833,346 | B1 | * | 12/2004 | Morrison et al. | 510/444 |

FOREIGN PATENT DOCUMENTS

| WO | WO 00/18856 A1 | * | 4/2000 |
| WO | WO 00/78909 A1 | * | 12/2000 |

* cited by examiner

*Primary Examiner*—Lorna M. Douyon
(74) *Attorney, Agent, or Firm*—Brahm J. Corstanje; Kim William Zerby; Steven W. Miller

(57) ABSTRACT

A process for preparing coated detergent granules in a fluidized bed. The fluidized bed is operated at a flux number of at least about 4 and at a Stokes Number of 10 to about 1000 using a coating solution or slurry having a viscosity from about 300 to about 100,000 centipoise, measured at 60° C. Upon drying, the resultant detergent particles have improved appearance and flow properties and may be packaged and sold as a detergent material or mixed with various other detergent ingredients to provide a fully formulated detergent composition.

13 Claims, No Drawings

PROCESS FOR COATING DETERGENT GRANULES IN A FLUIDIZED BED

CROSS REFERENCE TO RELATED APPLICATION

This application is a divisional of U.S. application Ser. No. 09/980,327, filed Nov. 30, 2001 now U.S. Pat. No. 6,790,821 which claims priority under 37 U.S.C. § 119(e) to U.S. Provisional Application Ser. No. 60/140,087, filed Jun. 21, 1999 and 60/143,578 filed Jul. 13, 1999.

FIELD OF THE INVENTION

The present invention relates to a process for coating detergent granules in a fluidized bed.

BACKGROUND OF THE INVENTION

Recently, there has been considerable interest within the detergent industry for laundry detergents which have the convenience, aesthetics and solubility of liquid laundry detergent products, but retain the cleaning performance and cost of granular detergent products. The problems, however, associated with past granular detergent compositions with regard to aesthetics, solubility and user convenience are formidable. Such problems have been exacerbated by the advent of "compact" or low dosage granular detergent products which typically do not dissolve in washing solutions as well as their liquid laundry detergent counterparts. These low dosage detergents are currently in high demand as they conserve resources and can be sold in small packages which are more convenient for consumers prior to use, but less convenient upon dispensing into the washing machine as compared to liquid laundry detergent which can be simply poured directly from the bottle as opposed to "scooped" from the box and then dispensed into the washing solution.

Granular detergent products are typically produced from one of two manufacturing methods. The first involves the spray-drying of a aqueous detergent slurry in a spray drying tower to produce detergent granules while the second involves dry mixing various components after which they are agglomerated with a binder such as surfactant. The resultant detergent particles are then dried to achieve an acceptable moisture content such that the finished product is flowable and non-caking in the package once delivered to the consumer. In both processes, the factors which impact these flow characteristics include chemical composition and type and length in the drying process.

Many surfactant materials included in granular detergents, including linear alkyl benzene sulfonates ("LAS"), ethoxylated alkyl sulfates and nonionic surfactants, tend to be relatively "sticky" in nature, difficult to fully dry and lead to lumping, caking and flowability problems in the finished product.

Accordingly, the need remains for a process which can produce a detergent granule having improved flow properties and aesthetics and which may be included in detergent compositions.

SUMMARY OF THE INVENTION

This need is met by the present invention wherein a process for coating a detergent granule is provided. The coated granules have improved surface, appearance and flow properties. The coated granules of the present invention have improved surface properties in that they are smoother and have a generally more uniform surface and appearance than prior art detergent particles. Further, the appearance of the particles have been improved in that they appear brighter and whiter than currently available detergent particles and have improved flow properties where the particles have reduced lumping and caking profiles.

In accordance with the present invention, a process for coating detergent granules in a fluidized bed is provided. The detergent granules of the present invention are preferably selected from spray-dried granules, wet agglomerates, dry agglomerates, detergent adjuncts or mixtures thereof. Particularly preferred are mixed agglomerates which are agglomerated mixtures of dry agglomerates and spray-dried granules. The coating material may be selected from anionic surfactants, silicates, hydrotropes and non-hydrating inorganic materials. Particularly preferred are non-hydratable inorganic coating materials including double salt combinations of alkali metal carbonates and sulfates. The coating material may also include detergent adjunct ingredients such as brighteners, chelants, nonionic surfactants, co-builders, etc.

The fluidized bed of the present invention is operated at a flux number of at least about 3.5, and more preferably from about 3.5 to 7.0 and most preferably from about 3.5 to about 5.0. In addition, the fluidized bed is operated at a Stokes number of greater than about 1.

Accordingly, it is an object of the present invention to provide a process for coating a detergent granule. It is an additional aspect of the present invention to provide a process for producing detergent granules that have improved appearance and flow characteristics. These and other objects features and advantages of the present invention will become apparent to those skilled in the art from a reading of the following detailed description and the appended claims.

DETAILED DESCRIPTION OF THE PREFERRED EMBODIMENTS

Definitions

As used herein, the word "particles" means the entire size range of a detergent final product or component or the entire size range of discrete particles, agglomerates, or granules in a final detergent product or component admixture. It specifically does not refer to a size fraction (i.e., representing less than 100% of the entire size range) of any of these types of particles unless the size fraction represents 100% of a discrete particle in an admixture of particles. For each type of particle component in an admixture, the entire size range of discrete particles of that type have the same or substantially similar composition regardless of whether the particles are in contact with other particles. For agglomerated components, the agglomerates themselves are considered as discrete particles and each discrete particle may be comprised of a composite of smaller primary particles and binder compositions.

As used herein, the phrase "geometric mean particle diameter" means the geometric mass median diameter of a set of discrete particles as measured by any standard mass-based particle size measurement technique, preferably by dry sieving. As used herein, the phrase "geometric standard deviation" or "span" of a particle size distribution means the geometric breadth of the best-fitted log-normal function to the above-mentioned particle size data which can be accomplished by the ratio of the diameter of the 84.13 percentile divided by the diameter of the $50^{th}$ percentile of the cumulative distribution ($D_{84.13}/D_{50}$); See Gotoh et al, *Powder Technology Handbook*, pp. 6–11, Marcel Dekker 1997.

As used herein, the phrase "builder" means any inorganic material having "builder" performance in the detergency context, and specifically, organic or inorganic material capable of removing water hardness from washing solutions. As used herein, the term "bulk density" refers to the uncompressed, untapped powder bulk density, as measured by pouring an excess of powder sample through a funnel into a smooth metal vessel (e.g., a 500 ml volume cylinder), scraping off the excess from the heap above the rim of the vessel, measuring the remaining mass of powder and dividing the mass by the volume of the vessel.

As used herein, "composition" and "granular detergent composition" are intended to include both final products and additives/components of a detergent composition. That is, the compositions produced by the processes claimed herein may be complete laundry detergent compositions or they may be additives that are used along with other detergent ingredients for laundering fabrics and the like.

As used herein, "surface area" mean the total amount of surface of a powder available for gas adsorption and thus includes both internal (i.e. that within cracks and crevices) and external surface area. Surface area is measured using BET multi point surface area analysis.

The process of the present invention involves the production of coated detergent granules for incorporation into a detergent composition. The process comprises in general, providing detergent granules to a fluidized bed to be coated. The detergent granules of the present invention comprise at least one detergent active material and are preferably selected from spray-dried detergent granules, wet detergent agglomerates, dry detergent agglomerates, mixed agglomerates and detergent adjunct ingredients such as enzyme, bleach, perfumes, raw materials or other granules typically incorporated into a detergent composition. The granules may be in particle, agglomerate or flake form.

Detergent adjunct ingredients includes but is not limited to, carbonates, phosphates, sulfates, zeolites or the like. Of course, other conventionally known ingredients may be included as well. Spray-dried detergent granules include those particles which are manufactured via a conventional spray-drying technique wherein a slurry of detergent materials is prepared and sprayed downward into a upwardly flowing stream of gas to dry the particles. A dry free flowing material is produced from the process. Wet detergent agglomerates includes those particles that are manufactured via an granulation type process wherein detergent adjunct ingredients such as described above are admixed with a liquid binder material such as surfactant or precursor thereof in a mixer or series of mixer to form granules of detergent materials. These particles are known as "wet agglomerates" until dried and as dry agglomerates upon exiting a drying stage Accordingly, the present invention entails the introduction of both raw material or the introduction of previously formed detergent granules for continued processing of the granules. In one preferred embodiment of the present invention, the granules of the present invention are agglomerates of a mixture of feed streams such as spray-dried granules, dry agglomerates and optionally detergent adjuncts that are agglomerated in an agglomeration process such as that described below. The preferred agglomerates are herein referred to as mixed agglomerates.

Dry, wet agglomerates or mixed agglomerates of the present invention are typically formed by an agglomeration of a highly viscous surfactant paste or a liquid acid precursor of a surfactant and the aforementioned detergent adjunct ingredients or formed granules such as spray-dried granules or detergent adjuncts are described above may be substituted. The agglomeration may be carried out in a high or moderate speed mixer after which an optional low or moderate speed mixer may be employed for further agglomeration, if necessary.

Alternatively, the agglomeration may be carried out in a single mixer that can be low, moderate or high speed. The particular mixer used in the present process should include pulverizing or grinding and agglomeration tools so that both techniques can be carried forth simultaneously in a single mixer. To that end, it has been found that the first processing step can be successfully completed, under the process parameters described herein, in a Lodige KM™ (Ploughshare) moderate speed mixer, Lodige CB™ high speed mixer, or mixers made by Fukae, Drais, Schugi or similar brand mixer. The Lodige KM™ (Ploughshare) moderate speed mixer, which is a preferred mixer for use in the present invention, comprises a horizontal, hollow static cylinder having a centrally mounted rotating shaft around which several plough-shaped blades are attached. Preferably, the shaft rotates at a speed of from about 15 rpm to about 140 rpm, more preferably from about 80 rpm to about 120 rpm. The grinding or pulverizing is accomplished by cutters, generally smaller in size than the rotating shaft, which preferably operate at about 3600 rpm. Other mixers similar in nature which are suitable for use in the process include the Lodige Ploughshare™ mixer and the Drais® K-T 160 mixer. Generally, in the process of the present invention, the shear will be no greater than the shear produced by a Lodige KM mixer with a tip speed of the ploughs below 30 m/s or even below 10 m/s or lower.

Preferably, the mean residence time of the various detergent ingredients in the low, moderate or high speed mixer is preferably in range from about 0.5 seconds to about 30 minutes, most preferably the residence time is about 0.5 to about 5 minutes. In this way, the density of the resulting detergent agglomerates is at the desired level.

This agglomeration is typically followed by a drying step. This drying step may be carried out in a wide variety of equipment including, but not limited to a fluid bed drying apparatus. Examples of dryer characteristics include fixed or vibrating; rectangular bed or round bed; and straight or serpentine dryers. Manufacturers of such dryers include Niro, Bepex, Spray Systems and Glatt. By way of example, an apparatus such as a fluidized bed can be used for drying while an airlift can be used for cooling should it be necessary. The air lift can also be used to force out the "fine" particles so that they can be recycled to the particle agglomeration process.

The agglomeration may comprise the step of spraying an additional binder in the mixers or fluid bed dryer to facilitate production of the desired detergent particles. A binder is added for purposes of enhancing agglomeration by providing a "binding" or "sticking" agent for the detergent components. The binder is preferably selected from the group consisting of water, anionic surfactants, nonionic surfactants, polyethylene glycol, polyvinyl pyrrolidone polyacrylates, citric acid and mixtures thereof. Other suitable binder materials including those listed herein are described in Beerse et al, U.S. Pat. No. 5,108,646 (Procter & Gamble Co.), the disclosure of which is incorporated herein by reference.

Another optional processing step to form the particle core of the present invention includes continuously adding a coating agent such as zeolites, recycled "fines" as described above and fumed silica to the mixer to improve the particle color, increase the particle "whiteness or facilitate free flowability of the resulting detergent particles and to prevent over agglomeration. When employing recycled fines as the coating agent, the fines are preferably in the approximate size range of 0.01 to 0.5 times the mean particle size of the larger particles. The granule coating will also improve the integrity of the fines layering and provide abrasion and attrition resistance during handling. In addition, the detergent starting materials can be fed into a pre-mixer, such as a Lodige CB mixer or a twin-screw extruder, prior to entering in the mixer. This step, although optional, does indeed facilitate agglomeration.

Also particularly preferred in the present invention are spray-dried detergent granules which comprise tower blown particles. In this process, the granules are formed by the preparation of a slurry of surfactant materials, water and detergent adjunct ingredients materials. The resultant slurry is then passed to a tower where the slurry is sprayed into a stream of air at temperatures typically ranging from about 175° C. to about 375° C. to dry the detergent slurry and formed detergent particles. Typically, resultant densities of these particles range from about 200 to about 600 g/l.

The particles of the present invention comprise at least about 50% by weight of particles having a geometric mean particle diameter of from about 500 microns to about 1500 microns and preferably have a geometric standard deviation of from about 1 to about 2. Preferably the geometric standard deviation is from about 1.0 to about 1.7, preferably from about 1.0 to about 1.4. The granular detergent composition resulting from the processes may comprise undersized or fine particles, wherein "fine particles" are defined as particles that have a geometric mean particle diameter that is less than about 1.65 standard deviations below the chosen geometric mean particle diameter of the granular detergent composition at a given span or geometric standard deviation. Oversized or large particles may also exist wherein "large particles" are defined as particles that have a geometric mean particle diameter that is greater than about 1.65 standard deviations above the chosen geometric mean particle diameter of the granular detergent composition at a given span or geometric standard deviation. The fine particles are preferably separated from the granular detergent composition and returned to the process by adding them to at least one of the mixers and/or the fluid bed dryer as described in detail below. Alternatively, fines may be controlled via spray of a binder into the fluid bed. Likewise, the large particles are preferably separated from the granular detergent composition and then fed to a grinder where their geometric mean particle diameter is reduced. After the geometric mean particle diameter of the large particles is reduced, the large particles are returned to the process by adding them to at least one of the mixers and/or the fluid bed dryer.

As described hereinbefore, detergent compositions of the present invention comprises granules that have been at least partially coated with a water soluble coating material thereby forming a water soluble coating layer on the granules. The particle coating layer imparts dramatically new surface and appearance properties on the granules of the present invention. The coated granules of the present invention have an appearance which is brighter and/or whiter than current detergent particles. This provides a more favorable response from consumers who prefer white detergent products.

Most importantly, the coated particles of the present invention provide improved clumping and flowability profiles to detergent products containing the particles of the present invention. The particle coating layer provides a coating which is crisper and non-tacky. While effective at improving flowability in all detergent products, it is particularly effective at preventing clumping in products containing surfactants which are more difficult to dry to a non-tacky state including nonionic surfactants, linear alkyl benzene sulfonates ("LAS"), and ethoxylated alkyl sulfates or in detergent products containing high amounts of surfactant actives (i.e. greater than about 25 wt % surfactant active).

The particle coating layer of the present invention at least partially coats the granule. While the desired state is for granules which are completely coated by the particle coating, it is, of course, anticipated that complete coverage will not be possible in all cases in a continuous, high speed manufacturing process. While it is rather difficult to quantify the extent of the coating layer coverage, it is observed that increasing the amount of coating solids, either by increasing the solids concentration in the solution or by spraying on more of the solution, results in improved benefits and the appearance of a more uniform coverage. The benefits of increased coverage is balanced with the cost of drying excess water in the process. Accordingly, in preferred embodiments of the present invention, adequate coverage is achieved by applying coating solids at more than about 3 wt. % and most preferably more than about 5 wt. % of the uncoated granule.

The particle coating layer of the present invention comprises a water soluble coating material. In preferred embodiments the coating material is selected from the group consisting of detersive surfactants such as anionic surfactants, hydrotropes, inorganic materials, organic salts, polymers and mixtures thereof.

The hydrotropes of the present invention are preferably selected from sulfonates salts such as alkali metal sulfonates in particular sodium xylene sulfonate, sodium toluene sulfonate, sodium cumene sulfonate hydrophobic secondary alkyl sulfate and sodium 3,5 disiopropylbenzenesulfonate; polyethlyene glycols having a molecular weight of from about 200 to about 8000 and polypropylene glycols having a molecular weight of from about 200 to about 8000. When hydrotropes are employed as the coating material the hydrotrope is preferably present in an amount of from about 1% to about 20%, more preferably about 2% to about 15% and most preferably about 3% to about 10% by weight of the finished detergent composition.

The surfactants of the present invention may include anionic, nonionic, zwitterionic, ampholytic and cationic classes and compatible mixtures thereof. Detergent surfactants are described in U.S. Pat. No. 3,664,961, Norris, issued May 23, 1972, and in U.S. Pat. No. 3,919,678, Laughlin et al., issued Dec. 30, 1975, both of which are incorporated herein by reference. Cationic surfactants include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference.

Nonlimiting examples of surfactant for use in the coating of the present invention include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3$ $(CH_2)_x(CHOSO_3^-M^+)$ $CH_3$ and $CH_3$ $(CH_2)_y(CHOSO_3^-M^+)$ $CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the surfactant system. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. When surfactants are employed as the coating material, the surfactant is preferably present in an amount of from about 1% to about 30%, more preferably about 3% to about 20% and most preferably about 5% to about 10% by weight of the finished detergent composition.

In preferred embodiments, the coating material comprises a mixture of anionic surfactants and hydrotropes. Ratios of the surfactant to hydrotrope preferably from about 95:5 to about 5:95 and more preferably range from about 90:10 to about 10:90. When mixtures are employed as the coating material, the mixture is preferably present in an amount of from about 1% to about 30%, more preferably about 3% to about 20% and most preferably about 3% to about 15% by weight of the finished detergent composition. Particularly preferred is a mixture of sodium linear alkyl benzene sulfonate and sodium xylene sulfonate at a ratio of from about 70:30 to about 95:5. The preferred viscosity range for the coating solution or slurry during application ranges from about 50 to about 100,000 centipoise, more preferably from about 100 to about 50,000 cp, and most preferably from about 300 to about 10,000 cp at 60 deg.C.

Additional preferred materials include inorganic salts and organic salts, polymers and combinations thereof. Suitable organic salts include alkali metal carboxylates such as citrates and acetates. Inorganic salts may include silicates, boron salts, phosphate salts, magnesium salts and various other glass forming or crystalline inorganic salts. Most preferred are non-hydrating materials. By non-hydrating it is intended that the material does not have a strong tendency to react with environmental water such as moisture present in composition or humidity in the air to form higher hydrate phases. For the purposes of the present invention, a non-hydrating coating means a coating layer in which at least 40 wt. % of the coating consists of a non-hydrating inorganic material, preferably more than about 60 wt. % and most preferably more than about 80 wt. % non-hydrating.

The non-hydrating material is preferably selected from alkali and/or alkaline earth metal sulfate and carbonate salts or mixtures of the two. A highly preferred materials are double salts of sulfate and carbonate having the formula $M_nX_n$:$MSO_4$:$MCO_3$, where MX can a salt compound such as a metal halide, and the molar fractions of $MSO_4$ and $MCO_3$ are both at least 10 mol % of the formula. More preferred, the molar ratio of $MSO_4$:$MCO_3$ is from about 90:10 to about 10:90 and more preferably from about 75:25 to about 60:40 where M independently represents an alkali or alkaline earth metal and n is an integer or fraction thereof from 0 to 5. Examples of these highly preferred materials are the water-free sulfates and water-free carbonate minerals that are formed naturally by evaporative deposition, such as Hanksite, KNa22(SO4)9(CO3)2Cl, and Tychite, Na6Mg2(CO3)4(SO4). An especially preferred material is a 2:1 molar ratio of the double salt $Na_2SO_4$:$Na_2CO_3$ otherwise known as "Burkeite", Na6(CO3)(SO4)2.

The particle coating layer may also include an detergent adjunct ingredient in addition to the particle coating material. These detergent adjunct ingredients may include a wide variety of ingredients, including but not limited to optical brighteners, pigments or dyes, chelants, nonionic surfactants, pH control agents, detergency co-builders, fillers and mixtures of these materials. Particularly preferred are pigments or dyes such as titanium dioxide, bluing agents such as copper sulfate, zinc thiosulfate and Ultramarine blue, Sparkle enhancers such as mica flake, fillers such as sodium carbonate and sodium sulfate and co-builders such as citrates and nonionic surfactants.

The granules of the present invention are produced by coating the granules as described hereinbefore with the particle coating material in a fluidized bed. In preferred processes according to the present invention, detergent granules, preferably dry agglomerates, spray-dried powder and detergent adjuct ingredients are mixed in a series of mixers including a moderate speed mixer followed by a fluid bed coating mixer wherein the formed detergent composition is coated in a fluidized bed as described hereinafter. In an even more preferred embodiment, the moderate speed mixer is followed by a fluid bed drying step wherein liquid binder is sprayed into the fluid bed to facilitate agglomeration prior to the fluid bed coating step. Optionally, the process may comprise the use of a high speed mixer prior to the moderate speed mixer in order to further facilitate mixing and agglomeration.

The fluidized bed is operated such that the flux number FN of the fluid bed is at least about 3.5, preferably from about 3.5 to about 7 and most preferably from about 3.5 to about 5.0. Flux number ($FN_m$) is a ratio of the excess velocity ($U_e$) of the fluidisation gas and the particle density ($p_p$) relative to the mass flux ($q_{liq}$) of the liquid sprayed into the bed at a normalized distance ($D_o$) of the spraying device. The flux number provides and estimation of the operating parameters of a fluidized bed to control coating within the bed. The flux number may be expressed either as the mass flux as determined by the following formula:

$$FN_m = \log_{10}[\{P_p U_e\}/q_{liq}]$$

or as the volume flux as determined by the formula:

$$FN_v = \log_{10}[\{U_e\}/q_{vliq}]$$

where $q_{vlig}$ is the volume of spray into the fluid bed. Calculation of the flux number and a description of its usefulness is fully described in WO 98/58046 the disclosure of which is herein incorporated by reference.

In addition, the fluidized bed is operated at a stokes number of greater than about 1, more preferably greater than 10–1000 and most preferably from about 100 to about 1000. The Stokes number is a measure of particle coalescence for describing the degree of mixing occurring to particles in a piece of equipment such as the fluid bed. The Stokes number is measured by the formula:

$$\text{Stokes number} = 4pvd/9u$$

wherein p is the apparent particle density, v is the excess velocity, d is the mean particle diameter and u is the viscosity of the binder. The Stokes number and a description of its usefulness is described in detail in WO 99/03964, the disclosure of which is herein incorporated by reference.

The granules of the present invention are passed into a fluid bed dryer having multiple internal "stages" or "zones". A stage or zone is any discrete area within the dryer, and these terms are used interchangeably herein. The process conditions within a stage may be different or similar to the other stages in the dryer. It is understood that two adjacent dryers are equivalent to a single dryer having multiple stages. The various feed streams of granules and coating material can be added at the different stages, depending on, for example, the particle size and moisture level of the feed stream. Feeding different streams to different stages can minimize the heat load on the dryer, and optimize the particle size and shape as defined herein.

Typically, the fluid bed mixer of the present invention comprises a first coating zone where the particle coating material of the present invention is applied. The coating zone involves the spraying of the coating material in aqueous or slurry form onto the fluidized particles. The bed is typically fluidized with heated air in order to dry or partially dry moisture from the spray coating as it is applied. The spraying is achieved via nozzles capable of delivering a fine or atomized spray of the coating mixture to achieve complete coverage of the particles. Typically, the droplet size from the atomizer is less than about 2 times the particle size. This atomization can be achieved either through a conventional two-fluid nozzle with atomizing air, or alternatively by means of a conventional pressure nozzle. To achieve this type of atomization, the solution or slurry rheology is typically characterized by a viscosity of less than about 500 centipoise, preferably less than about 200 centipoise at the point of atomization. While the nozzle location in the fluid bed may be in most any location, the preferred location is a positioning that allows a vertical down spray of the coating mixture such as a top spray configuration. To achieve best results, the nozzle location is placed at or above the fluidized height of the particles in the fluid bed. The fluidized height is typically determined by a weir or overflow gate height. The coating zone of the fluid bed is then typically followed by a drying zone and a cooling zone. Of course, one of ordinary skill in the art will recognize that alternative arrangements are also possible to achieve the resultant coated particles of the present invention.

Typical conditions within a fluid bed apparatus of the present invention include (i) from about 1 to about 20 minutes of mean residence time, (ii) from about 100 to about 600 mm of depth of unfluidized bed, (iii) a droplet size of less than about 2 times the size of the particles, preferably not more than about 100 micron, more preferably not more than 50 microns, (iv) from about 150 to about 1600 mm of spray height from the fluid bed plate or preferably 0–600 mm from the top of the fluid bed, (v) from about 0.1 to about 4.0 m/s of fluidizing velocity, preferably about 1.0 to 3.0 m/s and (vi) from about 12 to about 200° C. of bed temperature, preferably about 15 to about 100° C. Once again, one of ordinary skill in the art will recognize that the conditions in the fluid bed may vary depending on a number of factors.

The coated granules exiting the coating mixer may comprise in and of themselves a fully formulated detergent composition or in preferred embodiments may be admixed with additional ingredients, such as bleaching agents, enzymes, perfumes, non-coated detergent particles, and various other ingredients to produce a fully formulated detergent composition.

The coated granular detergent composition of the present invention achieves the desired benefits of solubility, improved aesthetics and flowability via the process of the present invention and the control or selection of the geometric mean particle diameter of certain levels of particles in the composition. By "improved aesthetics", it is meant that the consumer prefers a granular detergent product which has a more uniform appearance of particles as opposed to past granular detergent products which contained particles of varying size and composition. To that end, at least about 50%, more preferably at least about 75%, even more preferably at least about 90%, and most preferably at least about 95%, by weight of the total particles in the detergent product, have the selected mean particle size diameter. In this way, a substantial portion of the granular detergent product will have the uniform size so as to provide the aesthetic appearance desired by consumers.

Preferably, the geometric mean particle diameter of the particles is from about 500 microns to about 1500 microns, more preferably from about 600 microns to about 1200 microns, and most preferably from about 600 microns to about 1000 microns. The particle size distribution is defined by a relative tight geometric standard deviation or "span" so as not to have too many particles outside of the target size. Accordingly, the geometric standard deviation is preferably is from about 1 to about 2, more preferably is from about 1.0 to about 1.7, even more preferably is from about 1.0 to about 1.4, and most preferably is from about 1.0 to about 1.2. As can be recognized by one of ordinary skill in the art, the control of improperly sized particles via the present invention contributes to the tight span of the composition produced by the present invention.

While not intending to be bound by theory, it is believed that solubility is enhanced as a result of the particles in the detergent composition being more of the same size. Specifically, as a result of the particles being more uniform in size, the actual "contact points" among the particles in the detergent composition is reduced which, in turn, reduces the "bridging effect" commonly associated with the "lump-gel" dissolution difficulties of granular detergent compositions. Previous granular detergent compositions contained particles of varying sizes which leads to more contact points among the particles. For example, a large particle could have many smaller particles in contact with it rendering the particle site ripe for lump-gel formation. The level and uniform size of the particles in the granular detergent composition of the present invention avoids such problems.

By "a portion" of the particles, it is meant that at least some particles in the detergent composition contain a detersive surfactant and/or a detergent builder to provide the fundamental building blocks of a typical detergent composition. The various surfactants and builders as well as their respective levels in the composition are set forth hereinafter. Typically, the detergent composition will contain from about 1% to about 50% by weight of a detersive surfactant and from about 1% to about 75% by weight of a detergent builder.

A particularly important attribute of detergent powders is color. Color is usually measured on a Hunter Colorimeter and reported as three parameters "L", "a" and "b". Of particular relevance to the powdered detergent consumer is the whiteness of the powder determined by the equation L-3b. In general, whiteness values below about 60% are considered poor. Whiteness can be improved by a number of means such as for example including a pigment or whitening agent in the coating layer of the granules such as titanium dioxide.

Preferably the granular detergents of this invention have whitenesses of 60–100, preferably 75–100, more preferably, 85–100 and most preferably 92–100. Also preferred are granular detergents where all components have a whiteness difference (maximum–minimum) of less than about 40, preferably less than 30, more preferably less than 20 and most preferably less than 10.

Another important attribute of the granular detergent products of this invention is the shape of the individual particles. Shape can be measured in a number of different ways known to those of ordinary skill in the art. One such method is using optical microscopy with Optimus (V5.0) image analysis software. Important calculated parameters are:

"Circularity" which is defined as (measured perimeter length of the particle image)$^2$/(measured area of the particle image). The circularity of a perfectly smooth sphere (minimum circularity) is 12.57; and "Aspect Ratio" which is defined as the length/width of the particle image.

Each of these attributes is important and can be averaged over the bulk granular detergent composition. And the combination of the two parameters as defined by the product of the parameters is important as well (i.e. both must be controlled to get a product with good appearance). Preferably, the granular detergent compositions produced by the process of the present invention have circularities less than about 50, preferably less than about 30, more preferably less than about 23, most preferably less than about 18. Also preferred are granular detergent compositions with aspect ratios less than about 2, preferably less than about 1.5, more preferably less than about 1.3 most preferably less than about 1.2.

Additionally, it is preferred to have a uniform distribution of shapes among the particles in the composition. Specifically, the granular detergent compositions of this invention have a standard deviation of the number distribution of circularity less than about 20, that is preferably less than about 10, more preferably less than about 7 most preferably less than about 4. And the standard deviation of the number distribution of aspect ratios is preferably less than about 1, more preferably less than about 0.5, even more preferably less than about 0.3, most preferably less than about 0.2.

In an especially preferred process of the present invention, granular detergent compositions are produced wherein the product of circularity and aspect ratio is less than about 100, preferably less than about 50, more preferably less than about 30, and most preferably less than about 20. Also preferred are granular detergent compositions with the standard deviation of the number distribution of the product of circularity and aspect ratio of less than about 45, preferably less than about 20, more preferably less than about 7 most preferably less than about 2.

As previously stated, the coated particles of the present invention have improved surface properties in that the particles are more uniform in shape and smoother on the surface than the uncoated spray-dried or agglomerated detergent particles. These features are typically reflected in a reduction of the overall surface area of particles having the coating of the present invention as opposed to particles not having the coatings of the present invention. The coatings of the present invention reduce total surface area by smoothing irregularities and filling crevices on the surface of the particles. The coatings of the present invention preferably provide a reduction in overall surface area as measured by the formula:

[(Surface Area of Non-Coated Particles)−(Surface Area of Coated Particles)]/(Surface Area of Non-Coated Particles)*100=Percent of Surface Area Reduction of at least about 10%, more preferably at least about 20% and most preferably at least about 30%. A reduction in surface area as provided by the present invention may lead to improved flow properties and to improved overall aesthetics by providing a more reflective surface.

Surface Area Test Method

The surface area of the particles of the present invention are measured according to the following procedure. Detergent Particles are placed into a Micromeritics VacPrep 061, available from Micromeritics of Norcross, Georgia, for pre-test preparation. The particles are placed under a vacuum of approximately 500 millitorr and heated to a temperature of between 80 and 100° C. for approximately 16 hours. The BET multi-point surface area is then measured in a Micromeritics Gemini 2375 surface area analyzer using a mixture of helium and nitrogen gases and the following general conditions: Evacuation rate—500.0 mmHg/min; Analysis Mode—Equilibration; Evacuation Time—1.0 min.; Saturation Pressure—771.77 mmHg; Equilibration Time—5 sec. Helium/Nitrogen Pressure—15 psig; Helium and Nitrogen purity 99.9%, free space is measured and P/Po points cover 0.05 to 0.3 with 5 data points taken.

In an optional embodiment of the present invention, the coated particles of the present invention may be treated with a post coating gloss treatment to provide a gloss layer on the coated detergent particle. The gloss layer may comprise inorganic salt materials, chelating materials, polymeric materials and mixtures thereof. Preferred inorganic materials are sulfate salts such as magnesium sulfate, preferred chelants are diamines such as ethylene diamine disuccinic acids (EDDS), while preferred polymers include acrylic polymers and copolymers such as acrylic/maleic copolymers.

Detergent Components

Fully formulated detergent compositions of the present invention may include any number of conventional detergent ingredients. For example, the surfactant system of the detergent composition may include anionic, nonionic, zwitterionic, ampholytic and cationic classes and compatible mixtures thereof. Detergent surfactants are described in U.S. Pat. No. 3,664,961, Norris, issued May 23, 1972, and in U.S. Pat. No. 3,919,678, Laughlin et al., issued Dec. 30, 1975, both of which are incorporated herein by reference. Cationic surfactants include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference.

Nonlimiting examples of surfactant systems include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)$ $CH_3$ and $CH_3$ $(CH_2)_y$ $(CHOSO_3^-M^+)$ $CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the surfactant system. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

The detergent composition can, and preferably does, include a detergent builder. Builders are generally selected from the various water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates. Preferred are the alkali metal, especially sodium, salts of the above. Preferred for use herein are the phosphates, carbonates, silicates, $C_{10-18}$ fatty acids, polycarboxylates, and mixtures thereof. More preferred are sodium tripolyphosphate, tetrasodium pyrophosphate, citrate, tartrate mono- and di-succinates, sodium silicate, and mixtures thereof (see below).

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, all of which are incorporated herein by reference.

Examples of nonphosphorus, inorganic builders are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehl, issued Mar. 7, 1967, the disclosure of which is incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid. Some of these materials are useful as the water-soluble anionic polymer as hereinafter described, but only if in intimate admixture with the nonsoap anionic surfactant.

Other suitable polycarboxylates for use herein are the polyacetal carboxylates described in U.S. Pat. No. 4,144,226, issued Mar. 13, 1979 to Crutchfield et al., and U.S. Pat. No. 4,246,495, issued Mar. 27, 1979 to Crutchfield et al., both of which are incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition. Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Water-soluble silicate solids represented by the formula $SiO_2.M_2O$, M being an alkali metal, and having a $SiO_2:M_2O$ weight ratio of from about 0.5 to about 4.0, are useful salts in the detergent granules of the invention at levels of from about 2% to about 15% on an anhydrous weight basis, preferably from about 3% to about 8%. Anhydrous or hydrated particulate silicate can be utilized, as well.

Any number of additional ingredients can also be included as components in the granular detergent composition. These include other detergency builders, bleaches, bleach activators, suds boosters or suds suppressors, anti-tarnish and anti-corrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference.

Bleaching agents and activators are described in U.S. Pat. No. 4,412,934, Chung et al., issued Nov. 1, 1983, and in U.S. Pat. No. 4,483,781, Hartman, issued Nov. 20, 1984, both of which are incorporated herein by reference. Chelating agents are also described in U.S. Pat. No. 4,663,071, Bush et al., from Column 17, line 54 through Column 18, line 68, incorporated herein by reference. Suds modifiers are also optional ingredients and are described in U.S. Pat. No. 3,933,672, issued Jan. 20, 1976 to Bartoletta et al., and U.S. Pat. No. 4,136,045, issued Jan. 23, 1979 to Gault et al., both incorporated herein by reference.

Suitable smectite clays for use herein are described in U.S. Pat. No. 4,762,645, Tucker et al., issued Aug. 9, 1988, Column 6, line 3 through Column 7, line 24, incorporated herein by reference. Suitable additional detergency builders for use herein are enumerated in the Baskerville patent, Column 13, line 54 through Column 16, line 16, and in U.S. Pat. No. 4,663,071, Bush et al., issued May 5, 1987, both incorporated herein by reference.

The following examples are presented for illustrative purposes only and are not to be construed as limiting the scope of the appended claims in any way.

In the following examples all levels are quoted as % by weight of the composition:

EXAMPLE I

A coated granular detergent composition was produced via the following process. 1600 g of detergent particles comprising 50% by weight dry detergent agglomerates and 50% by weight of spray-dried detergent granules was fluidized in a batch fluidized bed to a bed height of 6 inches. The inlet temperature of the fluidizing air was 130° C. at a velocity of 1 m/s while the temperature of the bed was 45° C. a 25% active solution of burkeite was sprayed into the fluid bed to provide 5% solids of the final formula concentration. The fluid bed was operated at a Flux number of 4 and a Stokes number of 10.

What is claimed is:

1. A process for coating a detergent particles comprising the steps of coating a detergent granule having at least one detergent active material in a fluidized bed with a water-soluble coating having a viscosity of from about 300 to about 10.000 centipoise measured at 60° C. to form coated detergent granules, wherein said fluidized bed is operated at a flux number FN of at least about 4 and at a Stokes Number greater than 10 to about 1000.

2. The process as claimed in claim 1, wherein said fluidized bed is operated at a flux number FN of from 4 to about 7.0.

3. The process as claimed in claim 2 wherein said fluidized bed is operated at a flux number of from 4 to about 5.0.

4. The process as claimed in claim 1 wherein said fluidized bed is operated at a Stokes number from about 100 to about 1000.

5. The process as claimed in claim 1, wherein said detergent granules are selected from spray-dried granules, dry agglomerates, wet agglomerates, detergent adjuncts, mixed agglomerates and mixtures thereof.

6. The process as claimed in claim 1, wherein said water soluble coating material is selected from detersive surfactants, hydrotropes, inorganic salts, organic salts, and mixtures thereof.

7. The process as claimed in claim 6 wherein said coating material comprises an anionic surfactant or precursor thereof.

8. The process as claimed in claim 1 wherein said coating material further includes a detergent adjunct ingredients selected from the group consisting of brighteners, chelants, nonionic surfactants, co-builders and mixtures thereof.

9. The process as claimed in claim 1 further comprising the steps of mixing said coated detergent granules with a flow control aid to adhere said flow control aid to the surface of said granules.

10. The process as claimed in claim 9 wherein the flow control aid is an inorganic powder material with a mean particle size of less than about 5 microns and is selected from the group consisting of crystalline layered silicate, carbonate, sodium sulfate, aluminosilicate, magnesium silicate, calcium silicate, clay, and mixtures thereof.

11. A process for producing a detergent composition comprising:

a) mixing detergent granules selected from the group consisting of wet agglomerates, dry agglomerates, spray-dried granules, detergent adjunct ingredients and mixtures thereof in a moderate speed mixer to form a mixed agglomerate; and b) passing said mixed agglomerate to a fluidized bed coating and coating said mixed agglomerate with a water-soluble coating material comprising a mixture of anionic surfactant and hydrotrope to form coated detergent granules wherein said fluidized bed is operated at a flux number FN of at least 4 and a Stokes Number from 10 to about 1000.

12. The process as claimed in claim 11 further comprising the step of passing said mixed agglomerate to a fluid bed granulator and further agglomerating said mixed agglomerate prior to said coating step.

13. The process as claimed in claim 11 further comprising the steps of passing said granules through a high speed mixer prior to passing through said moderate speed mixer.

* * * * *